United States Patent
Zhao et al.

(10) Patent No.: US 11,184,968 B2
(45) Date of Patent: Nov. 23, 2021

(54) OCCUPANCY SENSOR CALIBRATION AND OCCUPANCY ESTIMATION

(71) Applicant: SIGNIFY HOLDING B.V., Eindhoven (NL)

(72) Inventors: Meng Zhao, Eindhoven (NL); Ashish Vijay Pandharipande, Eindhoven (NL); Mark Henricus Verberkt, Eindhoven (NL); Michiel Adriaanszoon Klompenhouwer, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/756,008

(22) PCT Filed: Oct. 11, 2018

(86) PCT No.: PCT/EP2018/077784
§ 371 (c)(1),
(2) Date: Apr. 14, 2020

(87) PCT Pub. No.: WO2019/076732
PCT Pub. Date: Apr. 25, 2019

(65) Prior Publication Data
US 2020/0305258 A1    Sep. 24, 2020

(30) Foreign Application Priority Data
Oct. 17, 2017  (EP) .................................. 17196726

(51) Int. Cl.
*H05B 47/10*    (2020.01)
*H05B 47/125*    (2020.01)
*H05B 47/115*    (2020.01)
*G06K 9/00*    (2006.01)
*G06F 1/3231*    (2019.01)

(52) U.S. Cl.
CPC ....... *H05B 47/125* (2020.01); *G06K 9/00369* (2013.01); *H05B 47/115* (2020.01); *G06F 1/3231* (2013.01)

(58) Field of Classification Search
CPC .. H05B 47/105; H05B 47/115; H05B 47/125; H05B 47/195
See application file for complete search history.

(56) References Cited

U.S. PATENT DOCUMENTS

| | | | |
|---|---|---|---|
| 9,035,769 B2 * | 5/2015 | Steiner | H05B 47/115 340/541 |
| 9,665,776 B2 | 5/2017 | Kleihorst et al. | |
| 10,240,751 B2 * | 3/2019 | Zapata | F21S 8/026 |
| 2011/0213588 A1 | 9/2011 | Lin et al. | |
| 2012/0206050 A1 * | 8/2012 | Spero | H05B 47/11 315/152 |

(Continued)

FOREIGN PATENT DOCUMENTS

| WO | 2017060083 A1 | 4/2017 |
|---|---|---|
| WO | 2017072158 A1 | 5/2017 |

*Primary Examiner* — Tung X Le

(57) ABSTRACT

Some embodiments are directed to an occupancy sensor calibration device (100) arranged to repeatedly detect an occupancy in vision data and a concurrent occupancy detection in the occupancy data, determine a location of the detected occupancy in the vision data, and store the location as part of the occupancy sensing region.

13 Claims, 8 Drawing Sheets

(56) References Cited

U.S. PATENT DOCUMENTS

| | | |
|---|---|---|
| 2014/0009069 A1 | 1/2014 | Znamenskiy et al. |
| 2015/0184842 A1 | 7/2015 | Chemel et al. |
| 2016/0184842 A1 | 6/2016 | Lessley et al. |
| 2016/0234916 A1 | 8/2016 | Mans et al. |
| 2017/0027045 A1 | 1/2017 | Chemel |
| 2018/0228006 A1* | 8/2018 | Baker .................... G10L 15/30 |
| 2020/0170093 A1* | 5/2020 | Mirsky ................ H04B 10/502 |

* cited by examiner

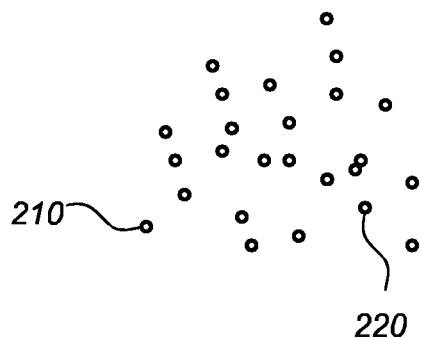
*Fig. 2a*
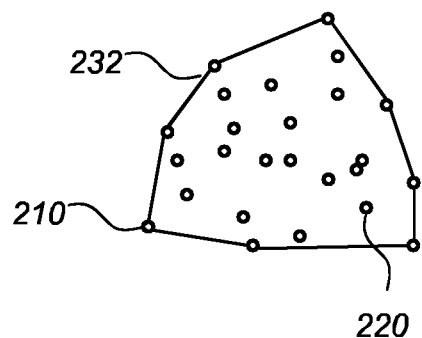
*Fig. 2b*
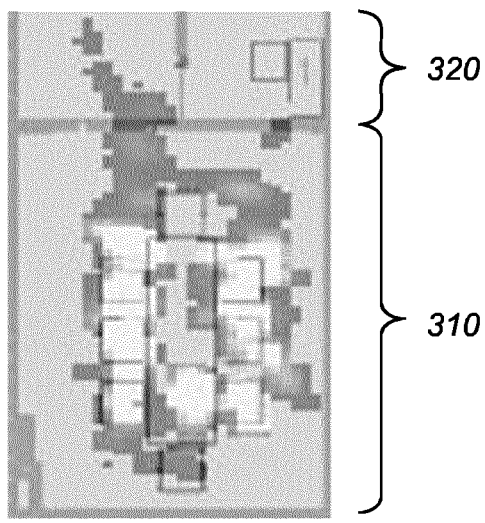
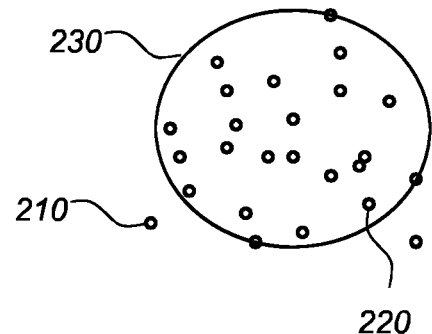
*Fig. 2c*
*Fig. 3*

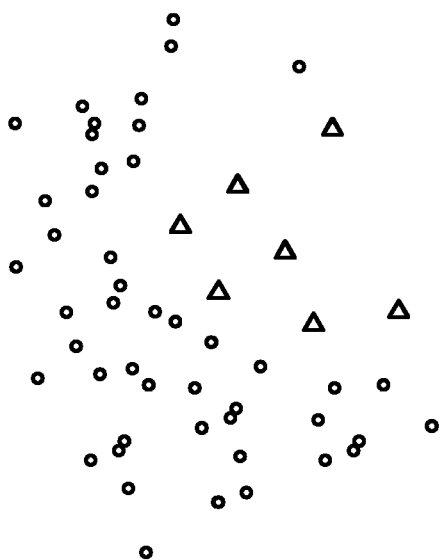 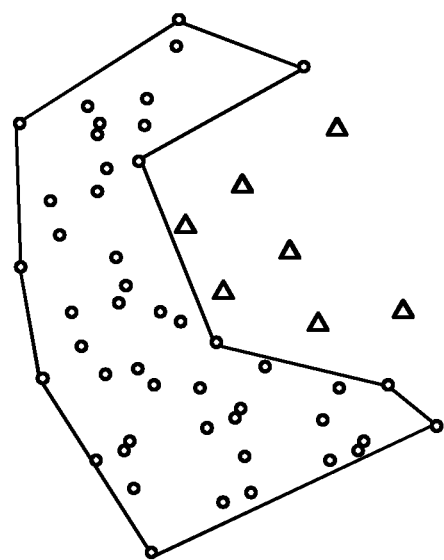
Fig. 5a                Fig. 5b
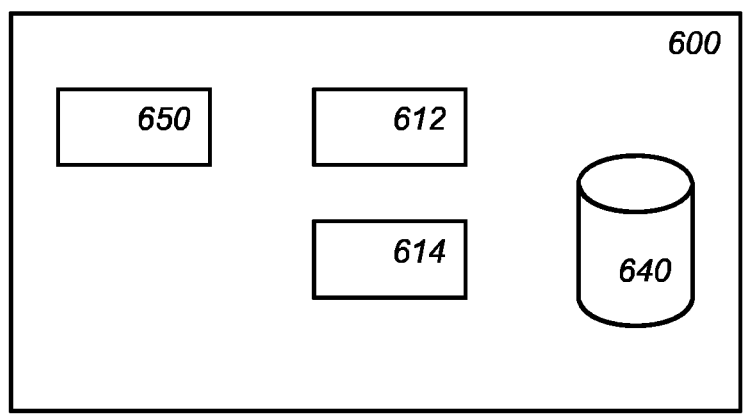
Fig. 6

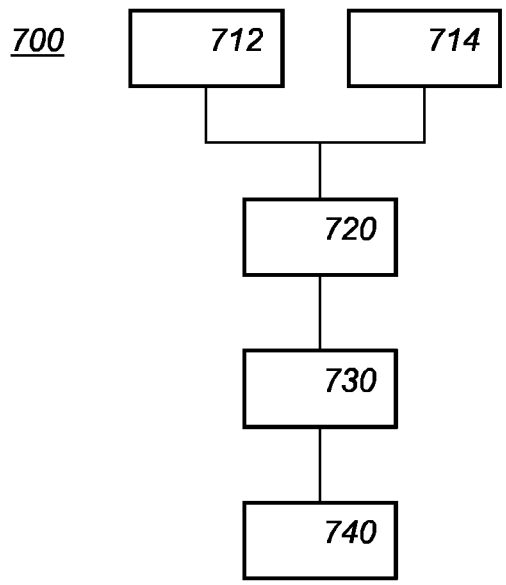
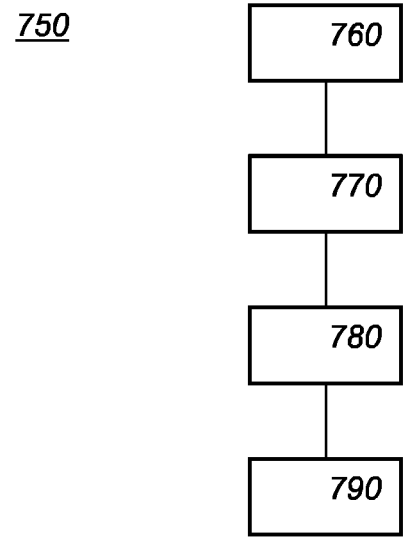
Fig. 7a
Fig. 7b
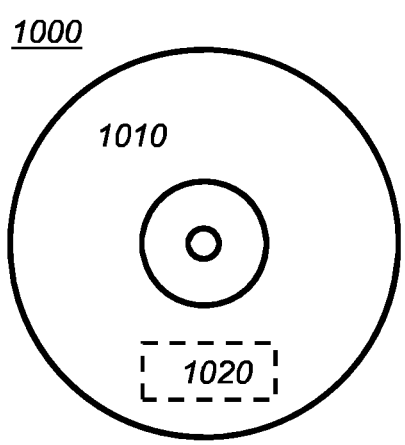
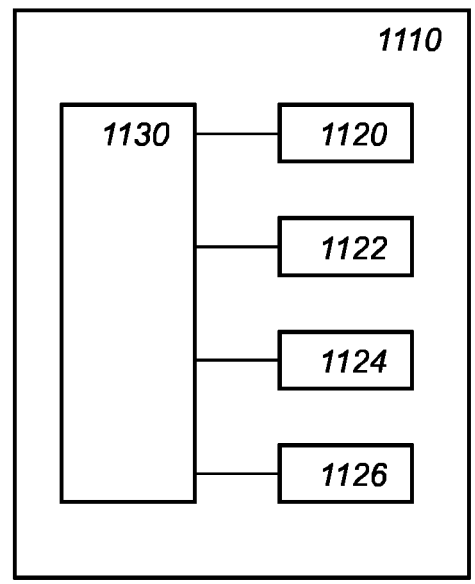
Fig. 8a
Fig. 8b

OCCUPANCY SENSOR CALIBRATION AND OCCUPANCY ESTIMATION

CROSS-REFERENCE TO PRIOR APPLICATIONS

This application is the U.S. National Phase application under 35 U.S.C. § 371 of International Application No. PCT/EP2018/077784, filed on Oct. 11, 2018, which claims the benefit of European Patent Application No. 17196726.8, filed on Oct. 17, 2017. These applications are hereby incorporated by reference herein.

FIELD OF THE INVENTION

The invention relates to an occupancy sensor calibration device, an occupancy aggregation device, an occupancy sensor calibration method, an occupancy aggregation method, a lighting system, and a computer readable medium.

BACKGROUND

Occupancy sensors form a critical part in a smart lighting system. Occupancy sensors that provide binary information on occupancy/vacancy within the sensing region of a sensor have been used to control lights and save energy. Conventional sensors used for this purpose are Passive infrared (PIR) sensors.

In a lighting system, the occupancy sensors may be deployed for lighting control. One may try to use the occupancy sensors to obtain other information, such as space use information, but unfortunately, even if the locations of the occupancy sensors are known, space use information cannot be inferred precisely or even used in data aggregation since this depends on the actual sensing region. In known systems, the sensing region of an occupancy sensor is unknown, or known only notionally, e.g., based on sensor specs and mounting information such as the installation height.

For example, aggregating, e.g., averaging data from a system with PIR sensors with narrow field-of-view would provide a different result than with PIR sensors with wide field-of-view (FoV). The same distribution of occupants may trigger more sensors with a wide field of view compared to sensors with a narrow field of view.

SUMMARY OF THE INVENTION

An occupancy sensor calibration device is provided as defined in the claims. The calibration device calibrates the sensing region of an occupancy sensor using the information obtained from a second sensor, a vision sensor. The data provided by the vision sensor not only allows determination of occupation versus non-occupation but also of the location of the occupation.

Such calibrated sensing regions are an advantage since they allow verifying correct placement of the occupancy sensor, and may also be used to obtain improved aggregated occupancy metric. For example, the occupancy data may be processed to obtain a count of people in an area, or to identify temporal and spatial usage patterns, which may provide more useful information to optimize space usage.

Further aspects of the invention concern an occupancy aggregation device, an occupancy sensor calibration method, an occupancy aggregation method, a lighting system, and a computer readable medium.

The calibration device and occupancy aggregation device are electronic devices. For example, they may be integrated in computer, or server, or lighting system controller, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of an occupancy sensor calibration device, FIGS. 2a and 2b schematically show an example of an embodiment of a convex hull, FIG. 2c schematically shows an example of an embodiment of a planar hull, FIG. 3 schematically shows an example of an embodiment of a heat map of locations where a PIR sensor detected occupancy, FIGS. 4a-4c schematically show examples of planar hulls, FIG. 4d schematically shows an example of determining sensing accuracy.

FIGS. 5a and 5b schematically show an example of a planar hull,

FIG. 6 schematically shows an example of an embodiment of an occupancy aggregation device, FIG. 7a schematically shows an example of an embodiment of an occupancy sensor calibration method, FIG. 7b schematically shows an example of an embodiment of an occupancy aggregation method, FIG. 8a schematically shows a computer readable medium having a writable part comprising a computer program according to an embodiment, FIG. 8b schematically shows a representation of a processor system according to an embodiment, FIGS. 9a and 9b schematically shows an example of an embodiment of a sensing region definition and historical management FIG. 9c schematically shows an example of an embodiment of a sensing region with building application space FIG. 9d schematically shows an example of occupancy taking in to account sensing regions, FIG. 9e schematically shows an example of occupancy taking in to account overlaps and multiple sensing regions.

LIST OF REFERENCE NUMERALS, IN FIGS. 1-6

Figure 1:
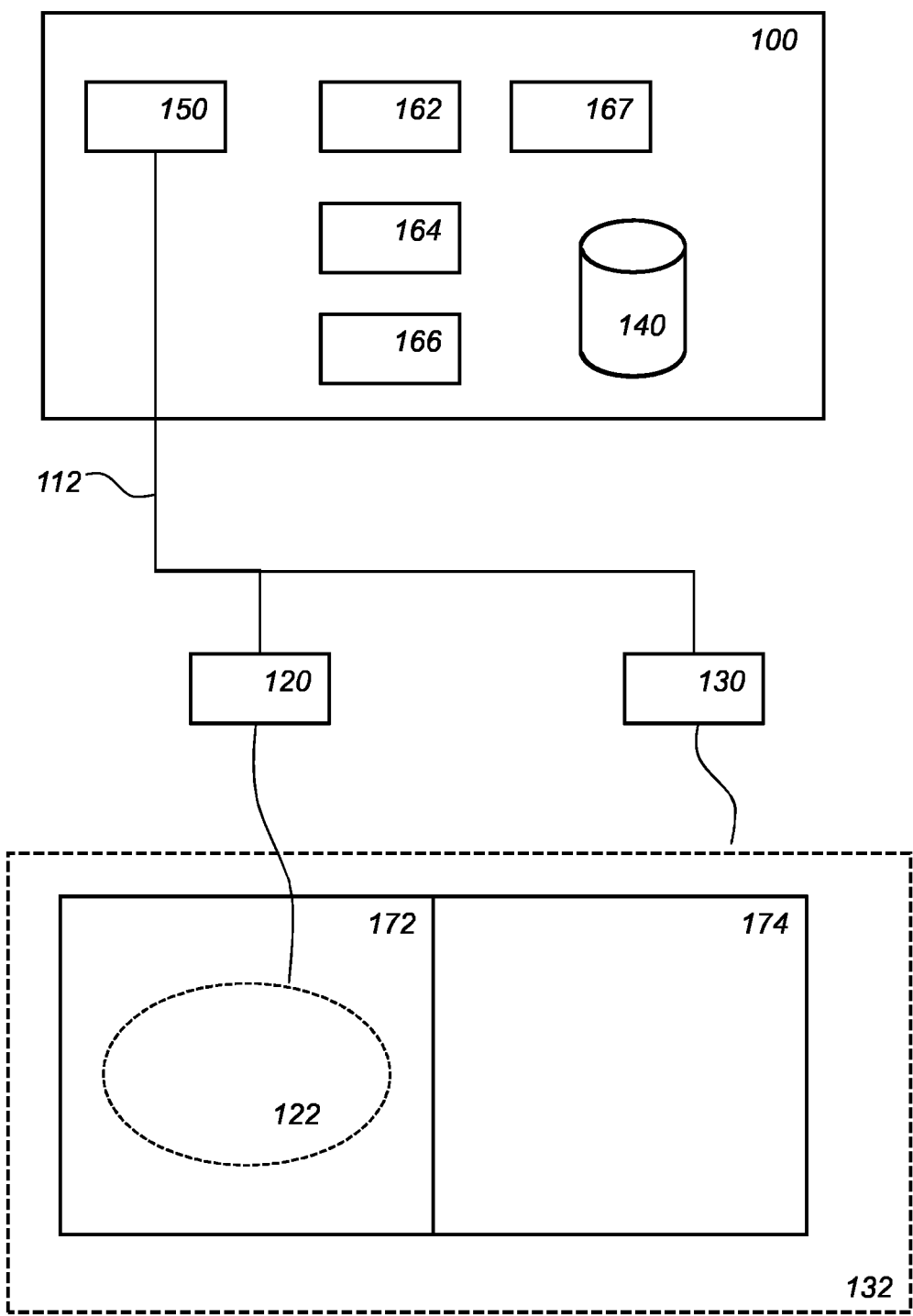

100 an occupancy sensor calibration device
112 a computer network
120 an occupancy sensor
122 an occupancy sensing region
130 a vision sensor
132 a vision sensing region
140 an occupancy storage
150 a communication interface
162 movement detection unit
164 correlation unit
166 location analyzer
167 verification unit
172 a first room
174 a second room
210, 220 a location
230 an ellipse
232 a polygon
310, 320 a room
410, 420 a room
422-428 a location
440 a hull of locations outside a region of interest
600 an occupancy aggregation device
650 a communication interface
640 a storage
612 occupancy region determiner
614 occupancy estimator

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

Occupancy sensors provide binary information on occupancy/vacancy within the sensing region of the sensor. Occupancy sensors may be used for example to control lights and save energy in a lighting system. For example, a light may be turned on only if the region that it illuminates is occupied. Conventional sensors used for this purpose are PIR sensors, although other types of (binary) occupancy sensors are also known. When occupancy sensors are used in a lighting system, it is desirable that the sensing region of an occupancy sensors matches the region with which it is associated. For example, a sensing region that is larger than its corresponding illumination region, will cause false positives, e.g., situations in which lighting for the illumination region is turned on, even though it is not occupied. For example, a sensing region that is smaller than its corresponding illumination region, may cause false negatives, e.g., situations in which lighting for the illumination region is not turned on, even though it is occupied. In fact, both problems may happen at the same time if a sensing region partially overlaps an illumination region.

Occupancy sensors may also be used in space management services which may thus use the lighting system infrastructure from which the occupancy sensors may be part. For example, the occupancy data may then be processed to obtain a count of people in an area to obtain average usage or to identify temporal and spatial usage patterns in order to provide more useful information to optimize space usage. Occupancy sensors may also be used for HVAC control. There is thus a desire to obtain more precise information on the sensing region of an occupancy sensor.

FIG. 1 schematically shows an example of an embodiment of an occupancy sensor calibration device 100. FIG. 1 shows a calibration system that comprises the occupancy sensor calibration device 100, an occupancy sensor 120 and a vision sensor 130 Calibration device 100 comprises a communication interface 150. Through communication interface 150, device 100 receives occupancy data from an occupancy sensor 120. In an embodiment, there may be multiple occupancy sensors, one of which is shown in FIG. 1. Device 100 may receive occupancy data for the multiple occupancy sensors and calibrate multiple occupancy sensors.

The occupancy sensor has an occupancy sensing region 122 in which occupancy is detected. The occupancy sensing region 122 is however not known, or not known with sufficient accuracy.

FIG. 1 shows two rooms: room 172 and room 174. The occupancy sensing region 122 in this example is restricted to room 172. In practice, occupancy sensors may also sense occupancy across multiple rooms. For example, a problem that has been observed by the inventors is that occupancy sensors can sense movement on the hallway next to a room, especially if a door to the room is open. As result, such an occupancy sensor may be triggered even if the room is empty. The reverse problem can also happen, if the sensing region is too small. In that case, no occupancy may be detected even though a room is occupied. As a result, the lights may turn off, even though people are using the room. In an embodiment, occupancy sensing regions are contained in rooms but this is not necessary. For example, in an open office a sensing region may cover part of a room. Here the same problems may occur.

Calibration device 100 may be part of the lighting system, but this is not necessary. For example, occupancy sensing results, e.g., occupancy triggers, may be received at calibration device 100 because the sensor trigger event are shared by the lighting system. For example, in an embodiment of the lighting system, the lighting system comprising multiple occupancy sensors, multiple luminaires, at least one lighting controller, and an occupancy sensor calibration device. The lighting controller uses the occupancy data to control the luminaires. For example, the lighting controller may comprise a communication interface for communicating with the multiple occupancy sensors, and the multiple luminaires. The lighting controller may also comprise a processor circuit arranged to receive occupancy data from the multiple occupancy sensors, determine one or more luminaires corresponding to the occupancy sensing region in which occupancy is detected according to the occupancy data, and transmit a control signal to the corresponding luminaire for increasing light output in response to the detected occupancy. If occupancy is not detected, the lighting controller may decrease light output. Interestingly, the occupancy data may be used both to control the luminaires and to calibrate the sensors. For example, the occupancy sensing regions may be calibrated using the occupancy data and the occupancy sensor calibration device.

Vision sensor 130 is more powerful than occupancy sensor 120. Vision sensor 130 sends vision data through communication interface 150 to calibration device 100. The vision data may comprise image data, e.g., in the form of still images or in the form of video images. The images may be preprocessed, e.g., in the vision sensor, before they are sent to calibration device 100. For example, the resolution of the images may be reduced, contrast may be increased, etc. The vision sensor may not always forward an image, but, e.g., only if needed, e.g., if a change was detected.

The vision data is suitable for determining occupancy, e.g., by detecting persons and/or detecting movement. Detecting occupancy from vision data is known per se. See for example "Multi-Camera People Tracking with a Probabilistic Occupancy Map", by Fleuret et al. Detecting occupancy and its location can be simplified by placing the vision sensor on the ceiling of a floor, since in general identification of a particular user is not needed for this application.

The vision sensor may be part of the lighting system, but typically will not be. For example, the vision sensor may be installed, e.g., temporarily for the purpose of calibrating occupancy sensor 120. As the vision sensor may be used temperorily for the purpose of calibrating the occupancy sensor, energy consumption of the vision sensor is limited. Moreover, in respect to privacy concerns, the vision sensor may not be required to remain on continiously, only temporarily for the purpose of said calibrating. For example, the vision sensor may be installed for another reason; for example, the vision sensor 120 may primarily be intended for security purposes. The sensing region of vision sensor 130 and occupancy sensor 120 at least partially overlap. In an embodiment, the sensing region 132 of vision sensor 130 comprises the sensing region 122 of occupancy sensor 120. Vision sensors typically have much sensing regions than occupancy sensors, such as PIR sensors. For example, in the example shown the sensing region 132 comprises rooms 172 and 174, e.g., the rooms may be cubicles. The same phenomena may happen with open offices. Typically, much fewer vision sensors are needed to cover an open office than occupancy sensors. Nevertheless, two or more vision sensors may be needed to calibrate a single occupancy sensor.

In an embodiment, occupancy sensor calibration device 100 comprises a data storage arranged to store the vision data and the occupancy data (not separately shown). The vision data and the occupancy data may comprise timestamps indicating the reception of the data. For example, the occupancy sensor calibration device 100 may be configured with a retrieval unit arranged to retrieve data from the data storage for which the timestamps lie in a particular time interval.

The vision sensor is configured to detect multiple occupancy. For example, from the vision data multiple persons, e.g., moving persons can be detected. Moreover, the location of the persons may be detected. A location may be relative, e.g., relative to the position of the sensor, or relative to a landmark which may be visible in the sensing region 132, e.g., a door post, or the like. A location may be absolute, for example, the location of the vision sensor may be known. In particular, the sensing region of the vision sensor may be known. The sensing region of the occupancy sensor may be determined using location data from the associated vision sensor over a long period of time, e.g., days, months, etc.

The occupancy sensors, e.g., sensor 120, the vision sensor 130 and the communication interface 150 may communicate over a computer network 112. The computer network may be a local area network, wide area network, an intranet, an internet, the internet, and the like. The network 112 may be wired, wireless, or part wired and part wireless. For example, the sensors may be arranged for a wireless protocol, e.g., ZigBee, while communication interface may be configured for a wired interface, e.g., ethernet. A router, hub, gateway etc., may be installed between communication interface 150 and sensors 120 and 130. The sensors do not necessarily share the same network. For example, communication interface 150 may comprise a first part for occupancy sensor 120 and a second part for vision sensor 130. For example, the occupancy sensing results may be obtained at communication interface 150 because the sensor trigger events are shared by a lighting system.

The execution of the calibration method is implemented in the processor circuit, examples of which are shown herein. FIGS. 1 and 6 show functional units that may be functional units of the processor circuit. For example, FIG. 1 shows a calibration device 100 comprising a movement detection unit 162 and a correlation unit 164. These figures may be used as a blueprint of a possible functional organization of the processor circuit. The processor circuit is not shown separate from the units in FIGS. 1 and 6. For example, the functional units shown in the figure may be wholly or partially be implemented in computer instructions that are stored at device 100 or 600, e.g., in an electronic memory of the device, and are executable by a microprocessor of the device. In hybrid embodiments, functional units are implemented partially in hardware, e.g., as coprocessors, e.g., image coprocessors, and partially in software stored and executed on the device.

Calibration device 100 comprises a movement detection unit 162 configured to detect an occupancy in the vision data. In an embodiment, movement detection unit 162 may be configured to detect movement in the vision data, e.g., detect differences between subsequent vision frames, e.g., images. It may not always be necessary to determine movement though, for example, in an example, the movement detection unit 162 is an occupancy detection unit and may be configured with an occupancy detection algorithm, e.g., which may be configured to analyze the vision data to recognize therein occupation patterns, e.g., working people. In this situation, the recognition of movement may not be necessary. Together with the occupancy also the location of the occupancy, e.g., of the movement is detected. The location may be absolute or relative. In an embodiment, the movement detection unit 162 is arranged to estimate if the occupancy will be detected by the occupancy sensor, e.g., by estimating if the occupancy has sufficient movement.

Correlation unit 164 is configured to detect a concurrent occupancy detection in the occupancy data. For example, correlation unit 164 may have access to occupancy events, e.g., triggers, received from occupancy sensor 120. Occupancy detected by occupancy sensor 120 is concurrent if it happens within a time interval, e.g., within 5 seconds of the occupancy detected in the vision data. In an embodiment, the occupancy sensor may not always report on occupancy even if such occupancy could be detected by the occupancy sensor, e.g., if the lights were just turned on. For example, a smart occupancy sensor may not forward a second occupancy trigger soon after sending a first one.

For example, movement detection unit 162 may detect movement at position (x1, y1) at 13:00 hours. Correlation unit 164 may find an occupancy event generated by occupancy sensor 120 at 13:00:04 hours. In this case the two events are correlated. Correlation unit 164 I configured to store the location as part of the occupancy sensing region. For example, Correlation unit 164 may store location (xl, yl) as part of the sensing region of occupancy sensor 120.

The occupancy sensors and vision sensors may include in the occupancy and vision data streams an identifier which identifies the sensors. A table in calibration device 100, e.g., in correlation unit 164 associates an occupancy sensor id with a vision sensor id. In an embodiment, an occupancy sensor is associated with multiple vision sensors. For example, this may be useful, if an occupancy sensor senses across multiple rooms, e.g., because of windows or open doors, yet the vision sensors do not, or not sufficiently. In this case, movement detected in any of the associated movement sensors that are correlated with the occupancy sensor may lead to a recorded location. Preferably, the multiple vision sensors use the same reference to report location.

The detection of correlated occupancy is repeated multiple times, e.g., over the course of multiple days, weeks or even months. As a result, a large number of locations is stored in an occupancy storage 140 which is arranged to store the locations. The storage may be local storage, e.g., a hard disk, but may also be implemented as an interface towards external storage, e.g., cloud storage.

The collection of locations may be directly used as the sensing region of occupancy sensor 120, but preferably processing of the locations is done. The calibration storage may comprise an optional location analyzer 166 for analyzing the location stored in storage 140 for occupancy sensor 120. Most of the examples, in the figures, of analyzing the locations use exemplary data for clarity. In practice, the data may be different, e.g., the number of locations may be much larger.

In some examples, the processor circuit of the occupancy sensor calibration device may be further arranged to communicate the locations or stored locations with a corresponding occupancy sensor. Herewith, the occupancy sensing region of said corresponding occupancy sensor may be calibrated accordingly to the invention. Thus, in some examples, the processor circuit of the occupancy sensor calibration device may be further arranged to update an occupancy sensing region of a corresponding occupancy sensor.

In examples, said occupancy sensor calibration device may be comprised within an occupancy sensor. Hence, an occupancy sensor may comprise the occupancy calibration device according to the invention. Such a configuration may also be referred to as an occupancy sensor system.

In examples, the communication interface according to the invention may be arranged to send information, such as the determined locations, such as the stored locations. Said information may be send to an external user device, which is configured to visualize said information, e.g. the calibrated locations according to the invention, such as for example in a heat map which indicates the sensing area of the occupancy sensor. This may be advantagous to re-align the occupancy sensor accordingly as desired.

In an embodiment, the device is configured to assign a location (xi, yi) to be within the sensing region of occupancy sensor if for the estimated location (xi, yi) from the vision sensor, the occupancy sensor is triggered. Optionally, the device may determine a heatmap of the frequency of said locations and filter regions below a specified frequency threshold, e.g., (as outliers. The region formed, e.g., by connecting the external said locations is the sensing region of the occupancy sensor, e.g., taking into account physically feasible regions.

In an embodiment, analyzer 166 creates a heatmap for locations. For example, this is done in FIG. 3. FIG. 3 schematically shows an example of an embodiment of a heat map of locations where a PIR sensor detected occupancy. For example, analyzer 166 may be configured with a heatmap algorithm. For example, a heatmap algorithm may, e.g., assign some energy to each location which is dispersed in a region around the detected location.

FIG. 3 was created from actual data. Shown in FIG. 3 are two rooms: room 310 and room 320. The occupancy sensor is located in room 310. As can be seen, most of the detected correlated occupancies are within room 310 The brighter colors correspond to a higher intensity of occupancy. It is visible in FIG. 3 that the occupancy sensor also senses some occupancy outside of room 310, but in room 320. This happen because people pass the open door of room 310, which is detected by the occupancy sensor.

In an embodiment, analyzer 166 is arranged to determine a planar hull of the locations stored as part of the occupancy sensing region. For example, in an embodiment analyzer 166 is configured to apply a convex hull algorithm to the locations stored as part of the occupancy sensing region. FIGS. 2a and 2b schematically show an example of an embodiment of a convex hull generation. In FIG. 2a locations are shown in which both occupancy sensor 120 and vision sensor 130 detect occupancy, e.g., movement; the locations are taken from the vision data of vision sensor 130. Such correlated occupancy locations are indicated as small circles; two of which are indicated with reference numbers 210 and 220. A convex hull algorithm is applied to the location to obtain a planar hull. The resulting polygon 232 is shown in FIG. 2b. For example, the planar hull may be stored as a polygon. In this case the polygon may be stored as a series of vertices. For example, the vertices may be a subset of the locations, e.g., such as vertex 210. FIG. 2c shows yet another example of a planar hull. In this example, the set of locations is approximated with an ellipse. Note that in this case, the fit of the ellipse has been improved by leaving out a number of outliers. For example, a minimizing error algorithm, such as a clustering algorithm, may be used to determine the ellipse. Note that storing an ellipse requires less storage than the multiple vertices of FIG. 2b. The same principle could be applied to FIG. 2b, e.g., reducing the number of vertices, and at the same losing some location, e.g., lose some accuracy. Convex hull algorithms are known per se from the area of combinatorial geometry, see, e.g., "The ultimate planar convex hull algorithm", by Kirkpatrick and Seidel. Instead of a polygon also splines may be used.

Figure 4A:
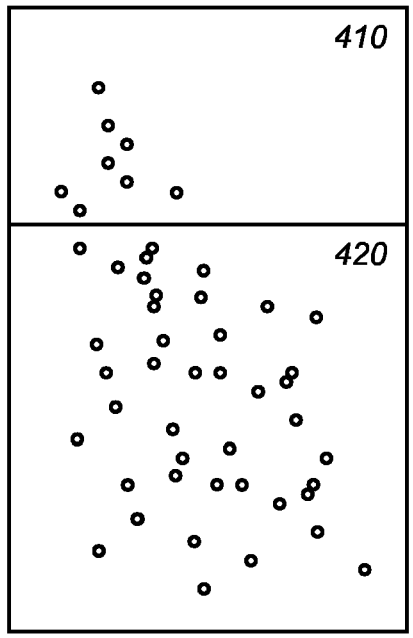
Figure 4B:
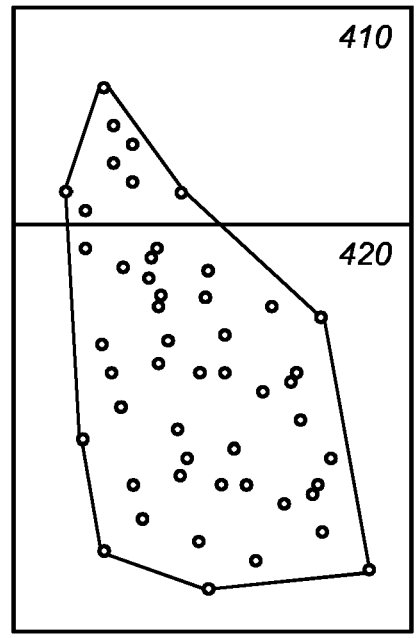
Figure 4C:
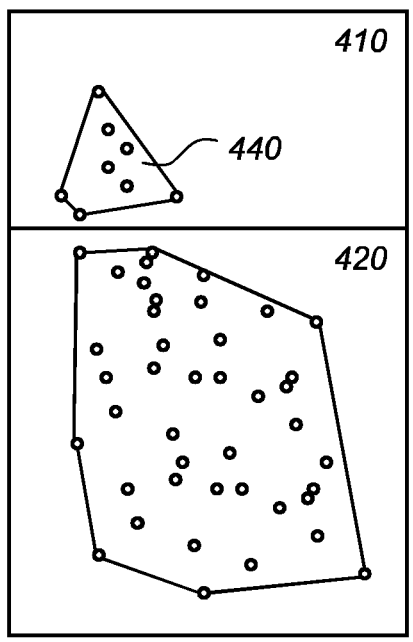

FIG. 4a shows correlated locations in two rooms: room 410 and room 420 corresponding to an occupancy sensor in room 420. FIG. 4b shows the result of applying a convex hull algorithm to the correlated locations. There is a risk that some of the locations shown in the convex hull of FIG. 4b cannot actually be detected. In reality, the locations detected in room 410 are an anomaly cause by a door or window in the wall between rooms 410 and 420. This problem may not be relevant though for all applications. In an embodiment, calibration device 100 comprises a room boundary storage storing room boundaries of multiple rooms. The room boundary storage is not separately shown in FIG. 1; in an embodiment storage 140 may be store the room boundaries, e.g., walls, as well. Analyzer 166 may be configured to partition the locations into sets of locations lying in the same room, and to apply a convex hull algorithm to the sets of locations separately. The latter is illustrated in FIG. 4c. The locations are partitioned into two sets: one corresponding to room 410 and one to room 420. Next a planar hull, e.g., a convex hull algorithm, is applied to the two sets separately. The result shown in FIG. 4c is improved over the one shown in FIG. 4b since it is more likely that the locations contained in the hull comprised in room 420 are actually detectable by the occupancy sensor. On the other hand, a small region between the two convex hulls may contain locations that are actually detectable by the occupancy sensor, but are not contained in the hull. Interestingly, this example also shows that the calibrated sensing regions do not necessarily have to be a connected region. Shown in FIG. 4c is a region 440 in which the occupancy sensor gives false positives. Depending on the region of interest, the existence of such a region may be detected and signaled as a problem.

One approach to finding the sensing area of an occupancy sensor is to detect the locations in which the occupancy sensor triggers. Further information that may be used are the locations in which the occupancy sensor does not trigger. For example, in an embodiment, correlation unit 164 is arranged to repeatedly detect an absence of concurrent occupancy detection in the occupancy data even though occupancy was detected in the vision data. In this case, correlation unit 164 may determine a location of the detected movement, e.g., obtain it from movement detection unit 164, and store the location as outside the occupancy sensing region. Especially, if for some reason the sensing region of the occupancy sensor is abnormal, e.g., due to a defect in the sensor, using locations in which the sensor did not trigger may be helpful. In an embodiment, the locations where the occupancy sensor did not trigger may be filtered, e.g., to remove locations that are too far away from the occupancy sensor to be relevant.

FIG. 5a schematically shows an example of locations, in which small circles indicate locations in which the occupancy sensor triggered, and small triangles indicate locations in which the occupancy sensor did not trigger even though there was some movement. FIG. 5b schematically shows an example of a planar hull constructed from the locations given in the FIG. 5a. The hull contains all, or at least most, of the locations where the occupancy sensor triggered and does not contain the locations where the occupancy sensor did not trigger. Methods to construct such a hull are known per se, from the area of combinatorial geometry, see, e.g., "On Polygons Excluding Point Sets", by Radoslav Fulek. As above, the hull may be a polygon, or a spline, etc. For example, additional criteria may be imposed, e.g., to maximize the area of a polygonal hull under the condition that its vertices are locations. For example, location analyzer 166 may be configured to construct a sensing region comprising the locations, e.g., comprising at least a percentage, say 90% of the locations at which correlation was found and excluding location, e.g., excluding at least a percentage, say 90% where correlation was not found.

In an embodiment, the occupancy sensor may not always report on occupancy even if such occupancy could be detected by the occupancy sensor, e.g., if the lights were just turn on. One has to take care to only include exclusion points if the occupancy should be detected, e.g., on may restrict an embodiment to only include a location as an exclusion if the lights are off. The later information may be obtained from the lighting system, e.g., over the computer network.

In an embodiment, calibration device 100 comprises an optional verification unit 167. For example, an occupancy sensor, e.g., occupancy sensor 120, may be installed in a region of interest, e.g., a room. The verification unit 167 may be configured to increase a first counter if concurrent movement in the vision data is detected outside the region of interest, an absence of movement in the vision data is detected inside the region of interest, and an occupancy detection in the occupancy data is detected.

Such a combination of factors indicates that the occupancy sensor triggered on the basis of movement outside the region of interest. For example, these may indicate false positive triggers based, e.g., on movement seen through a door or window. Verification unit 167 may also or instead be configured to increase a second counter if movement is detected in the vision data without concurrent occupancy detection within the region of interest.

This may indicate a situation in which the occupancy sensor gave a false negative, e.g., it should have triggered but did not.

If the first and/or second counter exceeds a threshold then the verification unit 167 may transmit a signal. For example, the signal may be an email, a report, an SMS, etc. The threshold may be an absolute number, e.g., 100. The threshold may be a percentage, e.g., 3% of triggers is a false positive and/or a false negative, etc. When a problem with false positives or negatives is discovered, e.g., through verification unit 167, the problem may be resolved by reconfiguring and/or moving the sensor. For example, the field of view may be modified, the sensor may be moved away from a door, a single sensor, e.g., with a large view may be replaced by two or more sensors, e.g., with a smaller view, etc.

In an embodiment of sensor reconfiguration, we consider two cases. First, detection of false triggers, in the scenario when the occupancy sensing region is beyond the region of interest, e.g., larger than a room. Consider the following proposed method. For an estimated location (xi, yi) from the vision sensor, such that (xi, yi) is outside the region of interest, and lights in the region of interest are OFF; this means the previous occupancy status is inoccupancy. In this case the condition of the light is used as a proxy for the condition of the occupancy sensor. If associated occupancy sensor is then triggered, then false_trigger_count+=1. If false_trigger count exceeds a certain tolerable limit, the device may declare that the occupancy sensor needs to be reconfigured, e.g., placement changed, or its field-of-view needs to be restricted.

Let us now consider an embodiment in which there are missed detections due to insufficient coverage of the occupancy sensor. Consider the following method. The device counts missed_detection_count: For an estimated location (xi, yi) from the vision sensor, such that (xi, yi) is in the region of interest, and the associated occupancy sensor is not triggered. If missed_detection_count exceeds a certain tolerable limit, declare that the occupancy sensor needs to be reconfigured, e.g., placement changed, or its field-of-view needs to be expanded.

Note that in the above two instances, the sensing region of the occupancy sensor can also be determined so that a design advice for sensor reconfiguration is also provided.

It is noted that one may construct a device in without with verification unit 167 without location analyzer 166.

Figure 4D:
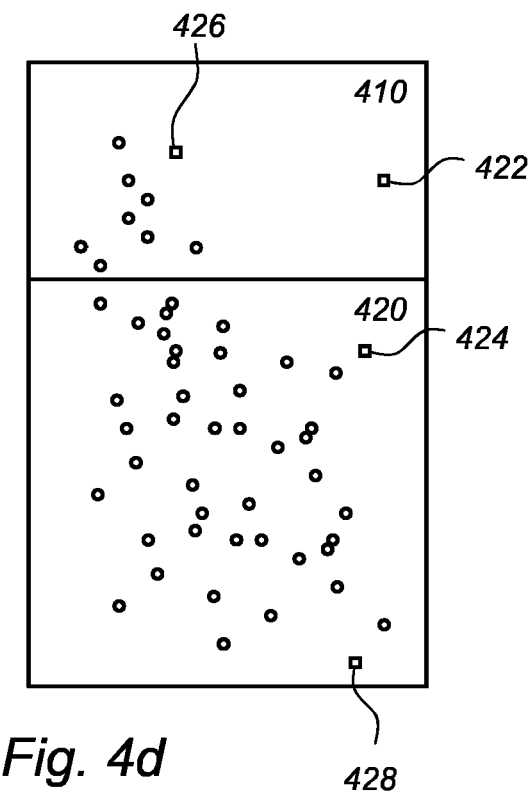

FIG. 4d shows four marked locations: 422, 424, 426 and 428.

Location 422 is outside the region of interest, motion is detected without triggering the occupancy sensor. This is no problem.

Location 426 is outside the region of interest, motion is detected with triggering the occupancy sensor. This is a false positive.

Location 424 is inside the region of interest, motion is detected without triggering the occupancy sensor. This is a false negative.

Location 428 is inside the region of interest, motion is detected with triggering the occupancy sensor. This is no problem.

If, for any reason, an occupancy sensor is reconfigured, it may also be recalibrated. For example, in an embodiment, the processor circuit may be arranged to receive a reconfiguration signal for the occupancy sensor, and to recalibrate the occupancy sensor after reception of said signal. For example, the signal may be sent by an operator, and may be received over an interface, e.g., an API, a user interface, etc. The processor circuit may be arranged to recalibrate the occupancy sensor using vision and or occupancy data having a timestamp dating after a reconfiguration of the occupancy sensor, e.g., as indicated by the recalibration signal.

FIG. 6 schematically shows an example of an embodiment of an occupancy aggregation device 600. The aggregation device 600 comprises a communication interface 650 arranged to receive occupancy data from multiple occupancy sensors, the occupancy sensors having corresponding occupancy sensing regions in which occupancy is detected. Aggregation device 600 uses the occupancy sensors to estimate occupancy, e.g., of a building, or of a floor etc. Indeed, aggregation device 600 comprises a storage 640 arranged to store the occupancy sensing regions corresponding to the multiple occupancy sensors.

Aggregation device 600 does not need a vision sensor, nor does communication interface 650 need to communicate with one. However, this is a possibility, for example, if calibration device and aggregation device 600 are integrated in the same device. In an embodiment, calibration device 100 is temporally integrated or connected with aggregation device 600 for calibration of the sensing device. After calibration the vision sensor(s) or the connection with the vision sensor, and/or the calibration software may be removed.

In an embodiment, aggregation device 600 comprises an occupancy region determiner 612 and an occupancy estimator 614, e.g., implemented as software in an electronic memory executed by a processor circuit.

Occupancy region determiner 612 is configured to determine occupancy sensors of the multiple occupancy sensors which detected occupancy in a time interval, e.g., from shared occupancy triggers. For example, only triggers in a certain time interval may be determined, e.g., during 5 minutes, an hour, a day, etc. Occupancy region determiner 612 is further configured to retrieve the occupancy sensing regions corresponding to the determined occupancy sensors from storage 640.

Occupancy estimator 614 is configured to compute an occupancy estimate from the retrieved occupancy sensing region. For example, the occupancy estimator 614 may add the areas of the retrieved occupancy sensing regions. The sum of the area may be taken as a measure for occupancy, it may also be further processed, e.g., divided, e.g., by a total area. In a more advanced implementation, the occupancy estimator 614 takes into account overlapping regions. For example, estimator 614 may be configured to only take non-overlapping occupancy sensing regions into account.

In an advanced implementation, the occupancy estimator 614 may dynamically determine the maximum number of non-overlapping sensing regions. For example, occupancy estimator 614 may construct a graph the vertices of which represent the retrieved sensing regions, and the edges represent the sensing regions that overlap. By solving the so-called maximum independent set problem for the graph, a good representation of the sensing regions is obtained. The selected regions may be used to compute the occupancy estimate. For example, one may count the number of selected regions. The non-selected sensing regions may be discarded, or given a smaller weight.

In the various embodiments of calibration device and/or the aggregation device, e.g., as shown in FIGS. 1 and 6, the communication interface which may be selected from various alternatives. For example, a communication interface may be a network interface to a local or wide area network, e.g., the Internet, a storage interface to an internal or external data storage, an application interface (API), etc.

The various embodiments of calibration device and/or the aggregation device, e.g., as shown in FIGS. 1 and 6, may have a user interface, which may include well-known elements such as one or more buttons, a keyboard, display, touch screen, etc. The user interface may be arranged for accommodating user interaction for performing a calibration, reviewing occupancy sensor problems, performing an occupancy estimate, etc. The various embodiments may include a display interface for displaying information on a display, e.g., a monitor, a smart phone, etc. For example, the display may show correlated or uncorrelated locations, computed sensing regions, heatmaps, etc.

Storage 140 and 640 may be implemented as an electronic memory, say a flash memory, or magnetic memory, say hard disk or the like. Storage 140 and 640 may comprise multiple discrete memories together making up storage 140 and 640. Storage 140 and 640 may also be a temporary memory, say a RAM. In the case of a temporary storage, the storage contains some means to obtain data before use, say by obtaining them over an optional network connection.

Typically, the calibration device and the aggregation device, e.g., as shown in FIGS. 1 and 6, each comprise a microprocessor (not separately shown) which executes appropriate software stored at the devices; for example, that software may have been downloaded and/or stored in a corresponding memory, e.g., a volatile memory such as RAM or a non-volatile memory such as Flash (not separately shown). The devices 120 and 130 may also be equipped with microprocessors and memories (not separately shown). Alternatively, the devices 100 and 600 may, in whole or in part, be implemented in programmable logic, e.g., as field-programmable gate array (FPGA). Devices 100 and 600 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, calibration device 100 comprises a movement detection circuit and a correlation circuit. In an embodiment, aggregation device 600 comprises an occupancy region determiner circuit and an occupancy estimator circuit. The circuits implement the corresponding units described herein. The devices may comprise additional circuits, e.g., corresponding to the units shown herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages.

Part or all of the memory may be an electronic memory, magnetic memory, etc. For example, the storage may have volatile and a non-volatile part. Part of the storage may be read-only.

FIG. 7a schematically shows an example of an embodiment of an occupancy sensor calibration method 700. The method comprises
- receiving 712 occupancy data from an occupancy sensor, the occupancy sensor having an occupancy sensing region in which occupancy is detected,
- receiving 714 vision data from a vision sensor, the vision sensor having a vision sensing region which at least partly overlaps the occupancy sensing region,
- repeatedly detecting 720 an occupancy in the vision data and a concurrent occupancy detection in the occupancy data, determining 730 a location of the detected occupancy in the vision data, and storing 740 the location as part of the occupancy sensing region.

FIG. 7b schematically shows an example of an embodiment of an occupancy aggregation method 750. Occupancy aggregation method 750 comprises
- receiving 760 occupancy data from multiple occupancy sensors, the occupancy sensors having corresponding occupancy sensing regions in which occupancy is detected, said being stored in a storage,
- determining 770 occupancy sensors of the multiple occupancy sensors which detected occupancy in a time interval,
- retrieving 780 occupancy sensing regions corresponding to the determined occupancy sensors from the storage,
- computing 790 an occupancy estimate from the retrieved occupancy sensing region.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

A method according to the invention may be executed using software, which comprises instructions for causing a processor system to perform method 700 or 750. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

FIG. 8a shows a computer readable medium 1000 having a writable part 1010 comprising a computer program 1020, the computer program 1020 comprising instructions for causing a processor system to perform a calibration and/or aggregation method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said calibration and/or aggregation method.

FIG. 8b shows in a schematic representation of a processor system 1140 according to an embodiment, e.g., of the calibration device and/or aggregation device. The processor system comprises one or more integrated circuits 1110. The architecture of the one or more integrated circuits 1110 is schematically shown in FIG. 8b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the calibration device and/or aggregation device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

Below various further embodiments are given.

Various types of occupancy sensors are employed in a connected lighting system for lighting control. The sensor data may also be used beyond lighting applications and services such as HVAC control and space management. For HVAC and space management services, aggregated occupancy information at different spatial aggregation levels is desired, for example HVAC zones, rooms, floors, and buildings. In this invention, we propose a generic data model representation of the occupancy information that associates a detection result to a sensing region with a validity time period. We also provide occupancy aggregation methods according to a generic building information model.

Aggregating, e.g., averaging data from a system with occupancy sensors with narrow field-of-view would provide a different result than with occupancy sensors with wide field-of-view (FoV). This is because the same distribution of occupants will trigger more sensors with a wide field of view compared to sensors with a narrow field of view. As such, this context information may be integrated into a sensor model. The sensing regions may also be tied with a common building information model (BIM) for data aggregation.

Conventional PIR sensors in a networked lighting system are may be used as a sensing device to gain occupancy information of the space it is in. Sensor trigger events are delivered for this purpose. However, in spaces with multiple sensors installed, it is very difficult to derive the occupancy situation of the space as a whole from sensor trigger events due to lack of knowledge of the field of view (FoV). As an example, consider a wall-mounted occupancy sensor reporting occupancy data. Without knowledge of its orientation, mounting height, FoV, it is not clear where occupancy is being reported with respect to the physical space.

Furthermore, aggregated occupancy information at various building space levels, e.g., desk island, multi-desk island open area, floor, building etc. may be required to determine the 'occupancy level' at each space level. In this context, 'occupancy level' is usually defined as the percentage of the space area that is occupied. It is not immediately obvious how proper data aggregation should be done, as it depends on the granularity and other properties of the sensor grid. One solution is to aggregate the result of individual sensor without considering additional properties like FoV, so 'occupancy level' translates to 'percentage of sensors occupied'.

In an embodiment, we incorporate sensing regions into a data model, map the sensing results to building spaces to produce common representations and then perform aggregation to address the aforementioned problems. We propose to incorporate the occupancy sensing region as an attribute into the sensor data model, and consequently represent the occupancy in the sensing region instead of associating an occupancy value to the device as is done currently. The sensing region of an occupancy sensor and an image sensor can both be represented in terms of the 'building space' concept in a building information model. In this context, a 'building space' can be any 2D area or 3D volume inside the building model. Aggregation is then done based on the building space definition. Different aggregation methods can be used depending on the application characteristic of the building space.

In an embodiment, a connected smart lighting system comprises multiple binary occupancy sensors, e.g., PIR sensors, multiple image sensors, and a lighting control system. A first option is to associate the data of an occupancy sensor with a sensing region with an associated configuration validity time period. A second option is to aggregate occupancy information at a spatial level of a building by mapping occupancy data over different sensing regions to required spatial level with a common building information model. A third option is to use location data in combination with occupancy sensor triggers to estimate the sensing region of the occupancy sensors, make an analysis of false triggers and missed detections and thereby provide configuration advice. As an example, we will consider a connected smart lighting system with multiple occupancy sensors, image sensors, lighting controllers, and luminaires.

In a first embodiment, consider an example deployment of sensors with a single modality, e.g., PIR sensors, or alternately one with multiple modalities e.g., PIR sensors and image sensors. In a conventional system, the sensor trigger events (occupied-vacant transitions) from the sensors are communicated to the receiving party. Typically, sensor locations are not known, and only their coarse associations within a room is known. More advanced commission may define sensor locations; however, related information on sensor orientation is typically not included and neither is kept tracked off, in case there are changes over time.

The sensing region of an occupancy sensor may be defined as a polygon in a coordinate system with reference to the building or other reference, e.g., a geo-coordinate system. This can be a 2D or 3D polygon, e.g., polygon mesh in the latter case. In the 2D case, the floor and ceiling will define the bounds in vertical dimension, and the sensing region is defined at desk or floor level depending on the application. In some cases, e.g., high open spaces or half-level floors or sensor mounted with a predominantly horizontal viewing direction, a 3D space definition could be needed, but in general a 2D definition will be enough. Instead of giving the sensor occupancy state change event, one may describe the space occupancy associated with the sensor sensing region polygon. In this way, a contextualized description of occupancy is defined with respect to the space. The sensing region can be represented as a building space as defined in open standards such as BIM. The sensing region may however change over time due to:

Lighting system or building renovation.
Device replacement, the new device has a different physical characteristic than the old one. As an example, the external lens is modified.
Device reconfiguration, e.g., the device is reoriented with a different sensing region.
Space reconfiguration, e.g., placing internal walls in open spaces or dividing larger meeting rooms into smaller rooms.

In an embodiment, we keep track of the sensing region over time with its polygon definition. The corresponding occupancy data model then uniquely describes the occupancy data for any given point of time in the building space.

Figure 9A:
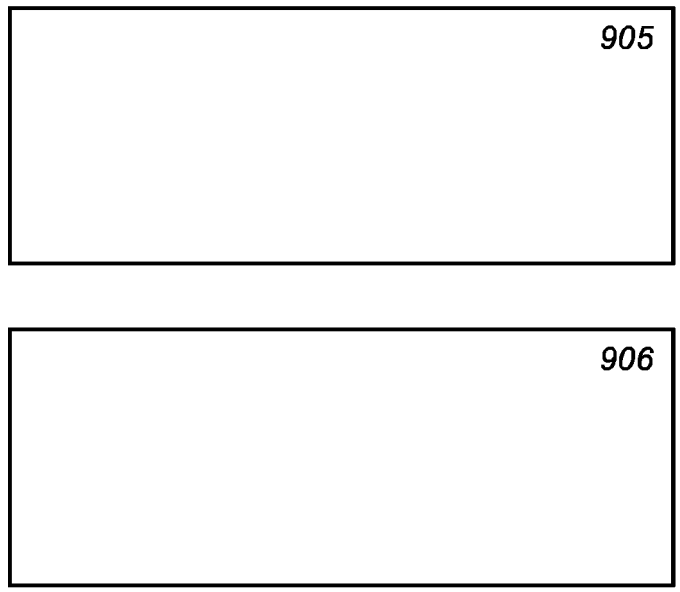
Figure 9B:
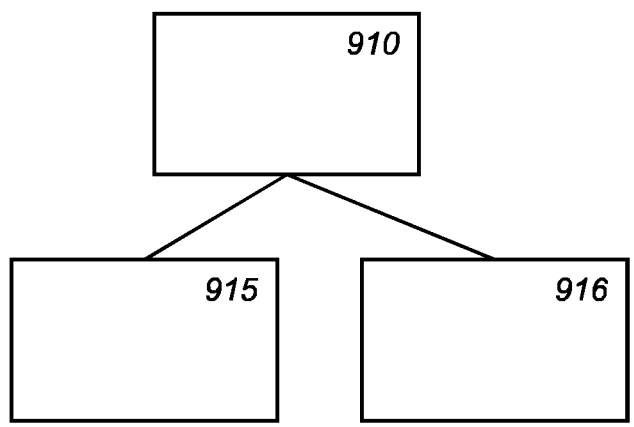

FIG. 9a gives an example of sensing region (SR) definition. For example, data item 905 may define SR1 and comprise 'Building floor 0' and a Polygon (((0,0), (0,50), (100, 50), (100,0), (0,0)). Data item 906 may define SR2 may comprise 'Building floor 0' and a Polygon (((0,0), (0,55), (100, 55), (100,0), (0,0)). FIG. 9b shows a data structure. Data item 910 may contain information such as Floor: FL0
UUID: 00009
Created:
Removed:
Data item 915 may contain
SR1
UUID: 000011
Created: 12-03-2016
Removed: 12-05-2017
Data item 916 may contain
SR2
UUID: 000012
Created: 12-05-2017
Removed:

Thus, when a sensor is, e.g., replaced, the old sensing region defined by Polygon1 will be annotated with remove time. A new sensing region is created and defined by Polygon2 and annotated with create time. When historical occupancy data between time 12-03-2016 and 12-05-2017 is requested, data from sensing region SR1 will be provided.

An advantage of the proposed model is that the data becomes independent of the device, its configuration, or its modality. It is also easily possible to fuse data across modalities since each data element is described by its sensing region. Data representing larger spaces with aggregation of multiple sensors can still be represented with a (larger, combined) sensing region.

In an embodiment, different occupancy data representation to common building information model may be aggregated. The sensing region gives an accurate and unprocessed notion of the occupancy information in the building. However, often the user would prefer an occupancy description for a given building application space, which may or may not be one to one mapping of the sensing region.

In an embodiment, the following steps are performed to aggregate occupancy to any specified spatial level. First all sensing regions that correspond to the desired spatial level are identified. The identification may be done based on geometrical matching based on the polygon definitions. Then occupancy data from the sensing regions is fetched. In case there is no overlap in any of the sensing regions, the occupancy data is aggregated based on the desired metric—for, e.g., an average occupancy value over an hour and sensing regions. In case there is data from sensing regions that overlap, it may first be fused to produce a single value over the sensing region. An example of the said fusion is an OR operation, if the data is binary.

Figure 9C:
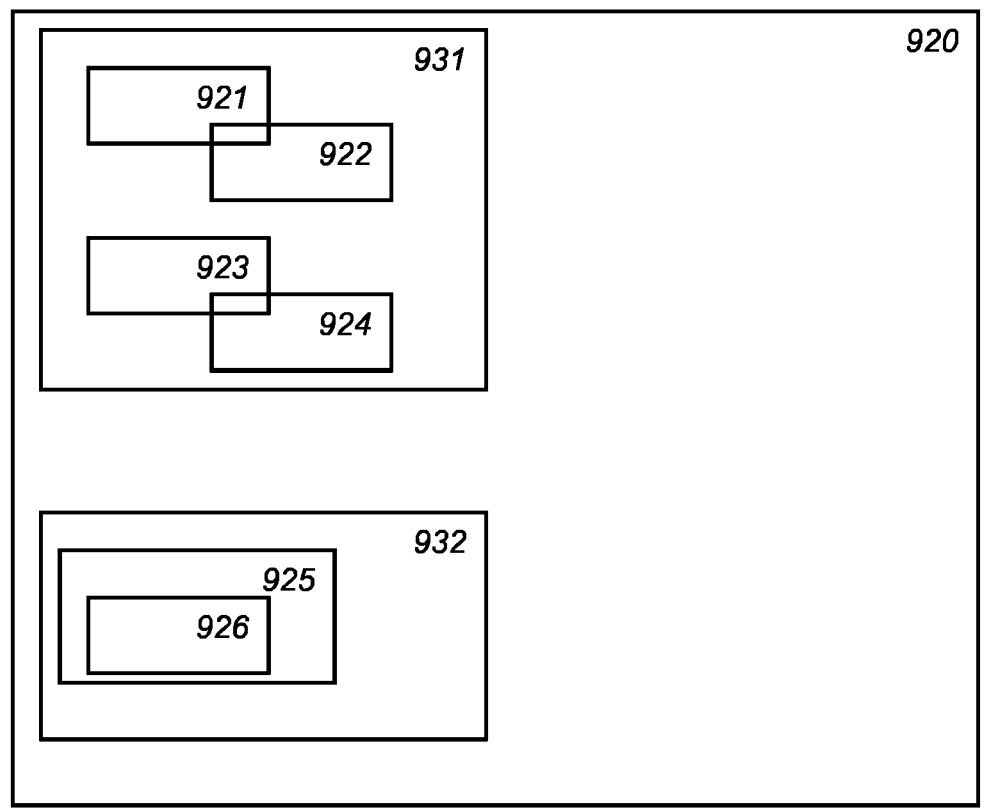

FIG. 9c shows Sensing regions, e.g., within a building application space a building floor 0 (920). Shown are an open office 1 (931), and a meeting room 1 (932). Also, a number of sensing regions are shown: SR1 921, SR3 922, SR4 923, SR5 924, SR6 926, and SR7 925. As shown in FIG. 9c, on building floor 0, we look at Open office 1 and Meeting room 1 as building application space with a certain function. The facility manager would like to know: The occupancy level of the open office, and/or the occupancy of the meeting room, if it is not occupied, it will show up in the internal booking system.

Figure 9D:
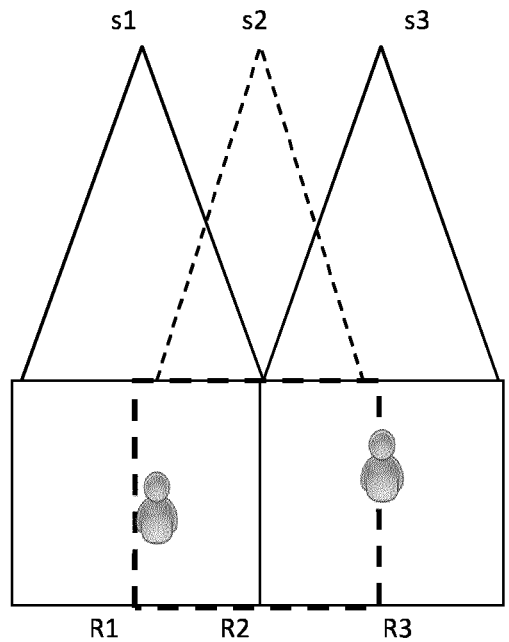

A conversion from sensing region occupancy to application space occupancy may be used. The aggregation method may be dependent on the application space type. Some examples of spatial aggregation are provided below:

In the meeting room and a single occupant office case, if any of the sensing regions shows occupancy, we regard the room or the office is occupied. For granular occupancy, the occupancy associated with non-overlapping sensing regions is used to determine occupancy level as shown in FIG. 9d. In this Figure, the aggregation method would determine that sensing regions R1 and R3 are non-overlapping and cover the space of interest, and treat R2 as redundant. Thus, occupancy data associated with R1 and R3 would be added to arrive at the occupancy in this space. Compare this to a method that would aggregate occupancy data at sensor level, without knowledge of sensing regions. In this case, all data from sensors s1-s3 would be aggregated, resulting in incorrect estimation of occupancy levels over the space.

Figure 9E:
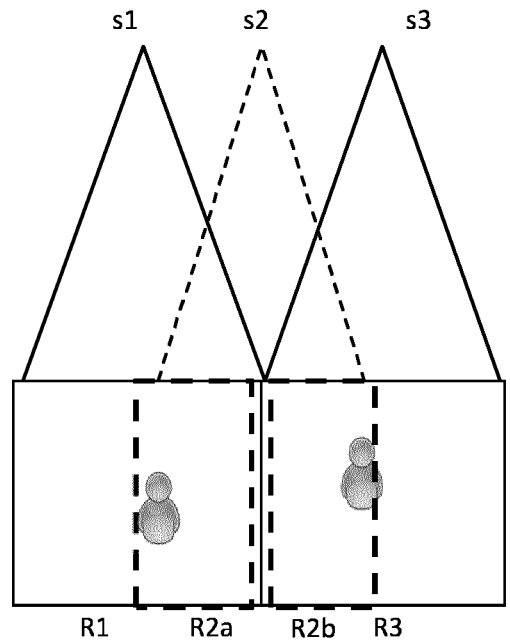

For open office, a percentage can be derived from: the percentage of occupied binary sensing regions, taking in to account overlaps, to the total number of binary sensing regions, and/or the percentage of number people detected (e.g. using an image sensor) over all sensing regions, taking in to account overlaps, to the maximum number of people, or capacity, that can be accommodated by the application space. As an example, consider FIG. 9e. In this case, sensors s1 and s3 are binary occupancy sensors with sensing regions R1 and R3 respectively, while sensor s2 is an image sensor that can report occupancy over two sensing regions R2a and R2b. In this case, by taking into account sensing regions of the sensors, the aggregated occupancy would be {d(R1) OR d(R2a)}+{d(R3) OR d(R2b)}. Here d(.) is occupancy data within a specified sensing region, OR denotes the logical OR operator.

The occupancy percentage of the application space at a given time can be delivered using the above spatial aggregations. If occupancy percentage over a time period is requested, further temporal aggregation can be performed by taking multiple spatial aggregated occupancy samples from the requested time period.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An occupancy sensor calibration device for calibrating an occupancy sensing region of an occupancy sensor in which occupancy is detected, the occupancy sensor calibration device comprising:
    a communication interface arranged to receive:
        occupancy data from the occupancy sensor,
        vision data from a vision sensor, the vision sensor having a vision sensing region which at least partly overlaps the occupancy sensing region,
    a processor circuit arranged to repeatedly detect an occupancy in the vision data and a concurrent occupancy detection in the occupancy data, determine a location of the detected occupancy in the vision data, and store the location as part of the occupancy sensing region, and
    an occupancy storage arranged to store the locations;
    wherein the processor circuit is arranged to repeatedly detect a movement in the vision data and an absence of concurrent occupancy detection in the occupancy data, determine a location of the detected movement, and store the location as outside the occupancy sensing region.

2. The occupancy sensor calibration device as in claim 1, wherein the processor circuit is arranged to determine a planar hull of the locations stored as part of the occupancy sensing region.

3. The occupancy sensor calibration device as in claim 1, wherein the processor circuit is arranged to apply a convex hull algorithm to the locations stored as part of the occupancy sensing region.

4. The occupancy sensor calibration device as in claim 1 comprising:

a room boundary storage configured for storing room boundaries of multiple rooms, wherein the processor circuit is arranged to:
partition the locations into sets of locations lying in the same room, and to apply a convex hull algorithm to the sets of locations separately.

5. The occupancy sensor calibration device as in claim 1, wherein the occupancy sensor is installed in a region of interest, e.g., a room, and wherein the processor circuit is arranged to:
increase a first counter if concurrent movement in the vision data is detected outside the region of interest, an absence of movement in the vision data is detected inside the region of interest, and an occupancy detection in the occupancy data is detected, and/or
increase a second counter if movement is detected in the vision data without concurrent occupancy detection within the region of interest, and
transmit a signal if the first and/or second counter exceeds a threshold.

6. The occupancy sensor calibration device as in claim 1, wherein the occupancy sensor is a PIR sensor.

7. The occupancy sensor calibration device as in claim 1, wherein the processor circuit is arranged to receive a reconfiguration signal for the occupancy sensor, and to recalibrate the occupancy sensor after reception of said signal.

8. The occupancy sensor calibration device as in claim 7, comprising a data storage arranged to store the vision data and the occupancy data, wherein the vision data and the occupancy data comprise timestamps indicating the reception of the data, the processor circuit being arranged to recalibrate the occupancy sensor using vision and or occupancy data having a timestamp dating after a reconfiguration of the occupancy sensor, e.g., as indicated by the recalibration signal.

9. An occupancy aggregation device comprising
a communication interface arranged to receive:
occupancy data from multiple occupancy sensors, the occupancy sensors having corresponding occupancy sensing regions in which occupancy is detected, and
a storage configured for storing the occupancy sensing regions corresponding to the multiple occupancy sensors,
a processor circuit configured to:
determine at least one occupancy sensor of the multiple occupancy sensors which detected occupancy in a time interval,
retrieve the occupancy sensing regions corresponding to the at least one determined occupancy sensor from the storage, and
compute an occupancy estimate from the retrieved occupancy sensing region;

wherein the occupancy aggregation device further comprising:
an occupancy sensor calibration device as in claim 1, at least one of the occupancy sensing region being calibrated with the occupancy sensor calibration device.

10. The occupancy aggregation device as in claim 9, wherein the processor circuit is configured to take only retrieved non-overlapping occupancy sensing regions into account for the computation of the occupancy estimate.

11. A lighting system comprising multiple occupancy sensors, multiple luminaires, at least one lighting controller, and an occupancy sensor calibration device as in claim 1, the occupancy sensors having an occupancy sensing region in which occupancy is detected,
said at least one lighting controller comprising:
a communication interface configured for communicating with the multiple occupancy sensors, and the multiple luminaires, and
a processor circuit arranged to:
receive occupancy data from the multiple occupancy sensors,
determine one or more luminaires corresponding to the occupancy sensing region in which occupancy is detected according to the occupancy data, and
transmit a control signal to the corresponding luminaire for increasing light output in response to the detected occupancy, wherein said occupancy sensing regions are calibrated using the occupancy data and the occupancy sensor calibration device.

12. An occupancy sensor calibration method, the method comprising:
receiving:
occupancy data from an occupancy sensor, the occupancy sensor having an occupancy sensing region in which occupancy is detected, and
vision data from a vision sensor, the vision sensor having a vision sensing region which at least partly overlaps the occupancy sensing region, and
repeatedly detecting an occupancy in the vision data and a concurrent occupancy detection in the occupancy data, determining a location of the detected occupancy in the vision data, and storing the location as part of the occupancy sensing region, and
repeatedly detecting a movement in the vision data and an absence of concurrent occupancy detection in the occupancy data, determining a location of the detected movement, and storing the location as outside the occupancy sensing region.

13. A non-transitory computer readable medium comprising data representing instructions to cause a processor system to perform the method according to claim 12.

* * * * *